(12) United States Patent
Lee

(10) Patent No.: US 9,404,543 B2
(45) Date of Patent: Aug. 2, 2016

(54) WINDOW REGULATOR APPARATUS FOR VEHICLE

(71) Applicant: Hyundai Motor Company, Seoul (KR)

(72) Inventor: Hyun Woo Lee, Wanju-gun (KR)

(73) Assignee: Hyundai Motor Company, Seoul (KR)

( * ) Notice: Subject to any disclaimer, the term of this patent is extended or adjusted under 35 U.S.C. 154(b) by 154 days.

(21) Appl. No.: 14/284,933

(22) Filed: May 22, 2014

(65) Prior Publication Data
US 2015/0107956 A1 Apr. 23, 2015

(30) Foreign Application Priority Data

Oct. 21, 2013 (KR) .................. 10-2013-0125643

(51) Int. Cl.
*F16D 11/14* (2006.01)
*E05F 11/38* (2006.01)
*E05F 11/50* (2006.01)

(52) U.S. Cl.
CPC .............. *F16D 11/14* (2013.01); *E05F 11/382* (2013.01); *E05F 11/505* (2013.01); *E05Y 2201/68* (2013.01)

(58) Field of Classification Search
CPC ......... F16D 11/02; F16D 11/04; F16D 11/08; F16D 11/10; F16D 11/14; F16D 2011/002; F16D 2011/004; F16D 2011/008; E05F 11/38; E05F 11/382; E05F 11/40; E05F 11/405; E05F 11/50; E05F 11/505; E05Y 2201/68
See application file for complete search history.

(56) References Cited

U.S. PATENT DOCUMENTS

| | | | | |
|---|---|---|---|---|
| 4,614,257 | A | * 9/1986 | Harada | .................. B60N 2/168 |
| | | | | 192/223.4 |
| 4,926,987 | A | * 5/1990 | Honma | ................ B60N 2/1615 |
| | | | | 192/223.4 |

FOREIGN PATENT DOCUMENTS

| | | |
|---|---|---|
| JP | 2001-90428 A | 4/2001 |
| JP | 3558612 B2 | 8/2004 |
| JP | 2008-18195 A | 1/2008 |
| KR | 2000-0000996 U | 1/2000 |

* cited by examiner

*Primary Examiner* — Jacob S Scott
(74) *Attorney, Agent, or Firm* — Morgan, Lewis & Bockius LLP

(57) ABSTRACT

A window regulator apparatus may include a first operation part including a first housing with which a bar-shaped central shaft may be through-connected, and a first elastic member which may be connected inside of the first housing, a second operation part disposed inwardly of the first operation part and including a second housing with which the central shaft may be through-connected, and a second elastic member connected inside of the second housing to be slidably formed in a longitudinal direction of the central shaft from above the central shaft, and a connection part selectively connecting or disconnecting the first operation part and the second operation part to or from each other.

11 Claims, 5 Drawing Sheets

WINDOW REGULATOR APPARATUS FOR VEHICLE

CROSS REFERENCE TO RELATED APPLICATION

The present application claims priority of Korean Patent Application Number 10-2013-0125643 filed on Oct. 21, 2013, the entire contents of which is incorporated herein for all purposes by this reference.

BACKGROUND OF THE INVENTION

1. Field of the Invention

The present invention relates to a window regulator apparatus for a vehicle, and more particularly, to a window regulator apparatus to make a glass of a vehicle door ascend or descend by turning a handle with a relatively small force.

2. Description of Related Art

Generally, a window regulator apparatus for a vehicle door is an apparatus which is mounted at a frame of a vehicle to transfer a driving force of a user or a motor to a window so as to make glass ascend or descend.

A prior art discloses a window regulator apparatus in which one end of a vehicle body is supported to a lower portion of a door glass of a vehicle, another end of the vehicle body is provided with a regulator arm having an arm gear and a first gear mounted at the handle to rotate the arm gear depending on a rotation of the handle, and a second gear is mounted between the first gear and the arm gear to reduce a rotating power to turn the handle.

However, the above Utility Model makes a user use less force by merely using the gear, but has a structure occupying a considerable space and needs to perform a cumbersome process to hold a constant force.

Therefore, a need exists for a window regulator apparatus capable of facilitating a torque transfer while having a simple structure.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a window regulator apparatus capable of facilitating a torque transfer while having a simple structure.

In an aspect of the present invention, a window regulator apparatus may include a first operation part having a first housing with which a bar-shaped central shaft is through-connected, and a first elastic member which is connected inside of the first housing, a second operation part disposed inwardly of the first operation part and having a second housing with which the central shaft is through-connected, and a second elastic member connected inside of the second housing to be slidably formed in a longitudinal direction of the central shaft from above the central shaft, and a connection part selectively connecting or disconnecting the first operation part and the second operation part to or from each other.

The connection part may include a pipe-shaped first socket which is through-connected with the first housing, and a pipe-shaped second socket which is through-connected with the second housing.

The first socket and the second socket are provided with rugged parts formed at a point to correspond to each other so that the first socket and the second socket are fitted with each other.

An outside of the second socket is provided with a third elastic member to prevent the second socket from rotating at a time of a rotation of the central shaft, such that a reverse rotation of the second elastic member is prevented.

The second operation part slides to the first operation part side at a time of a rotation of the central shaft and after the second elastic member is compressed by a predetermined amount, the first socket and the second socket of the connection part are fitted with each other to simultaneously compress the first elastic member and the second elastic member.

An inside of the second socket is connected with a pipe-shaped support member which may have both ends provided with flange parts and through-connects the second socket.

An inside of the support member is provided with a screw groove and the central shaft is provided with a screw thread along an outer circumferential surface of the central shaft to make the support member rotate along the screw thread of the central shaft so that the second socket performs a translational motion.

The first housing and the second housing may have a plurality of protrusions protruding along outer circumferential surfaces thereof and the protrusions are through-connected with a plurality of connection members.

The connection member is held in the state in which the first housing and the second housing are spaced apart from each other at a predetermined interval, and the second housing slides on the connection member at a time of a rotation of the central shaft to move to the first housing side.

The first elastic member and the second elastic member are a spiral spring.

An inside of the first operation part and an inside of the second operation part are provided with first and second covers respectively and a fourth elastic member is formed between the second operation part and the second cover.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
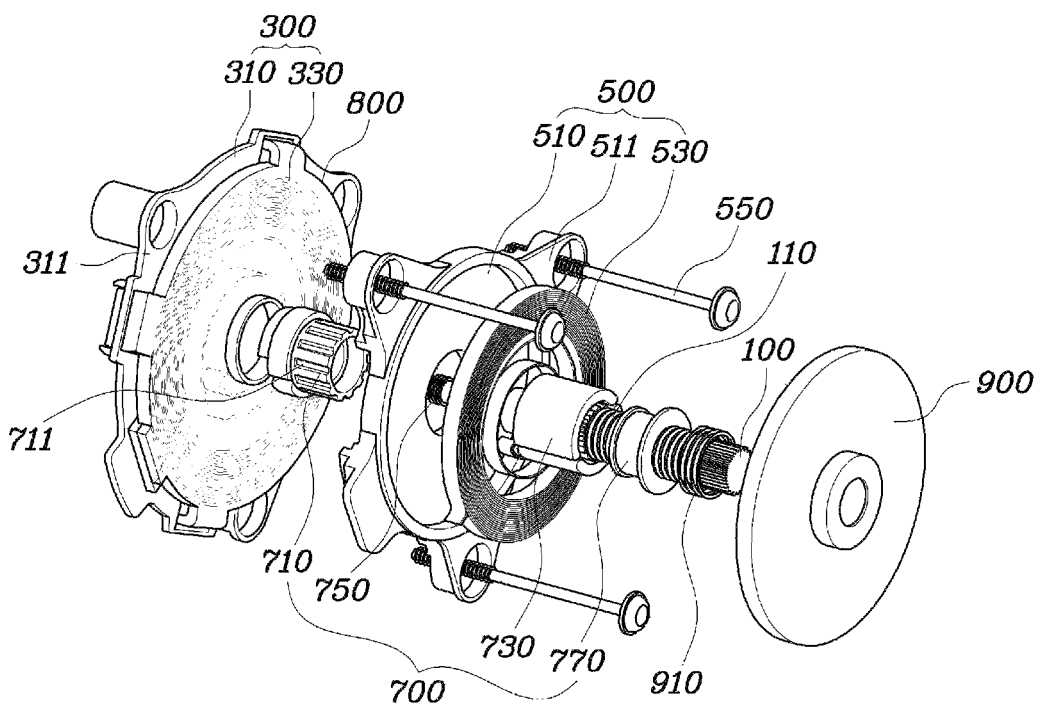
FIG. 1 is an exploded perspective view of a window regulator apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a window regulator apparatus according to an exemplary embodiment of the present invention will be described with reference to the accompanying drawings.

Figure 2:
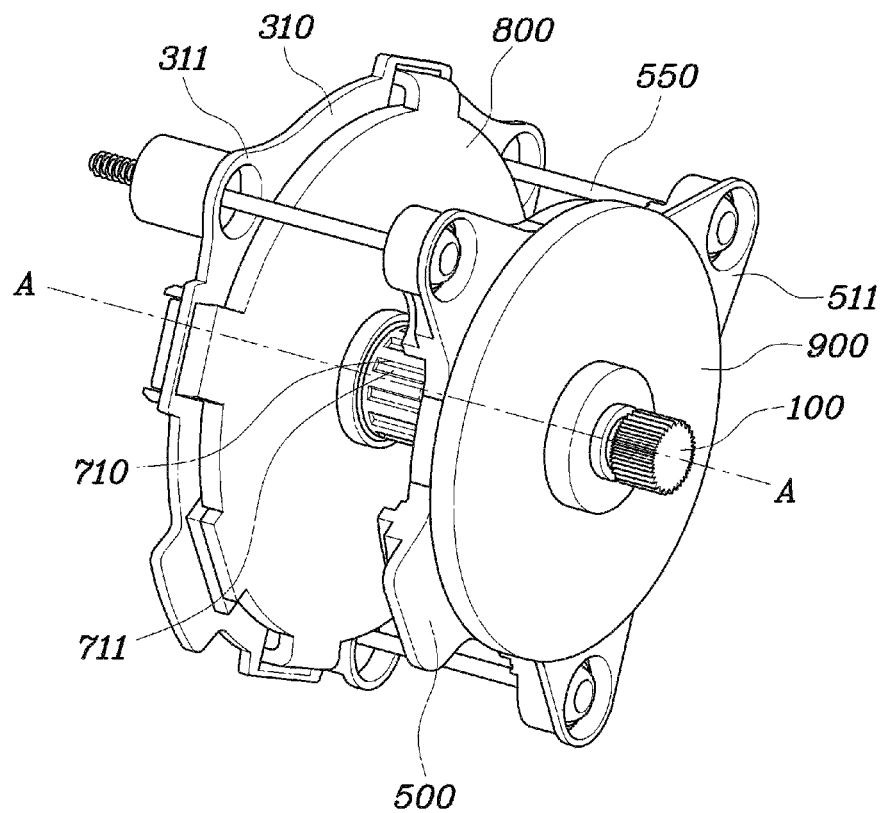
FIG. 2 is an assembled view of FIG. 1, in which a free rotating section at the time of ascending the window glass is illustrated.
Figure 3:
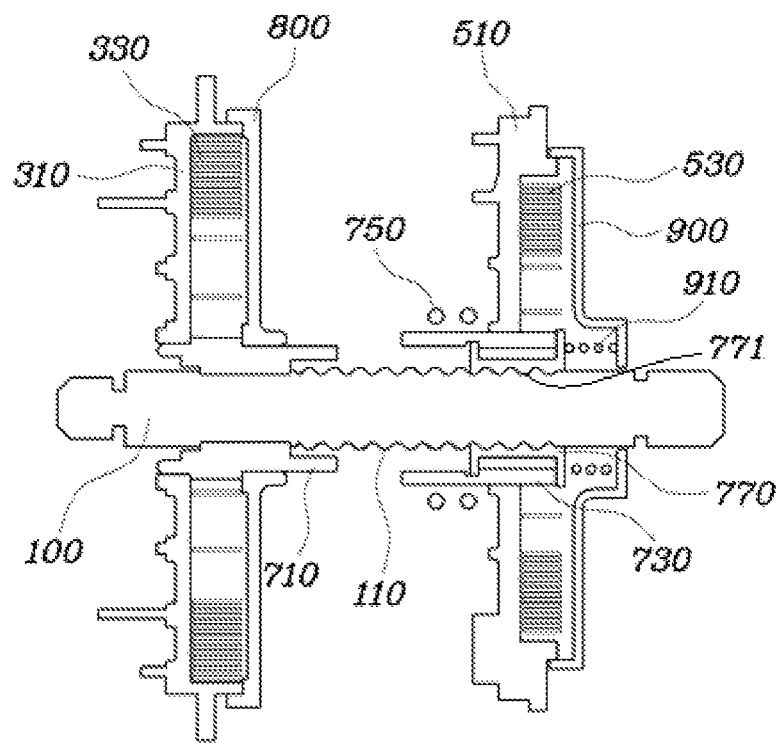
FIG. 3 is a cross-sectional view taken along the line A-A' of FIG. 2.
Figure 4:
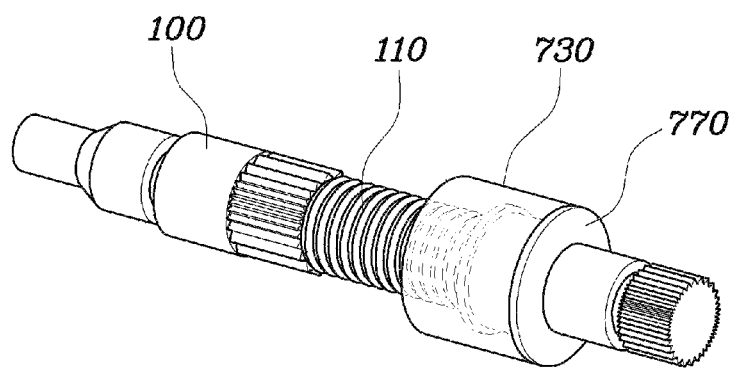
FIG. 4 is a diagram illustrating a coupling part in the state of FIG. 2.
Figure 5:
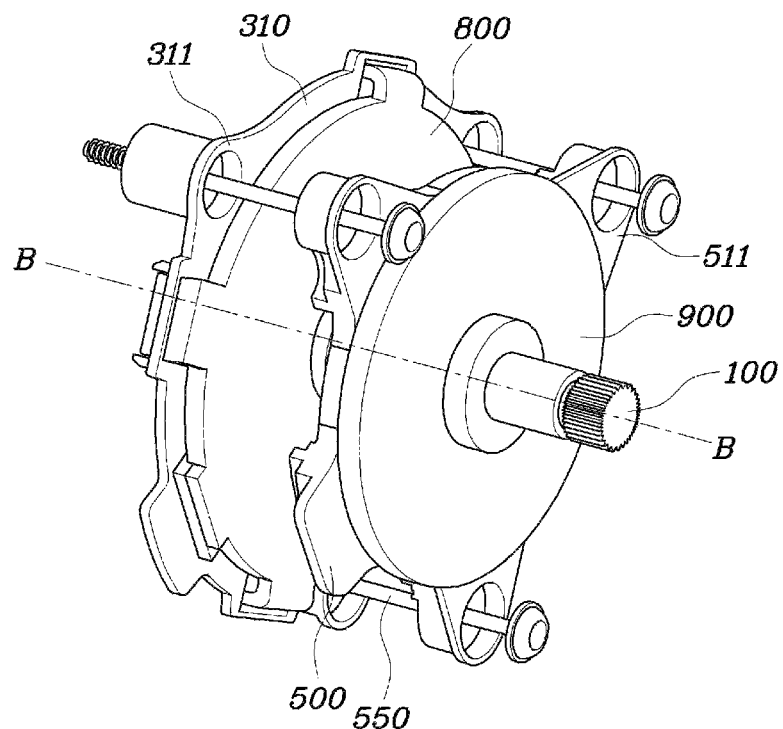
FIG. 5 is a diagram illustrating a torque transfer section at the time ascending the window glass of FIG. 2.
Figure 6:
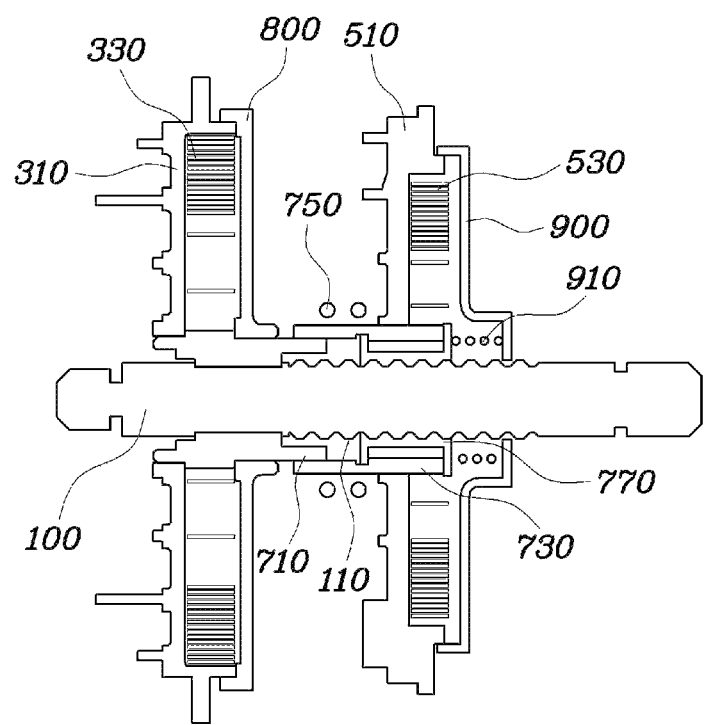
FIG. 6 is a cross-sectional view taken along the line B-B' of FIG. 5.
Figure 7:
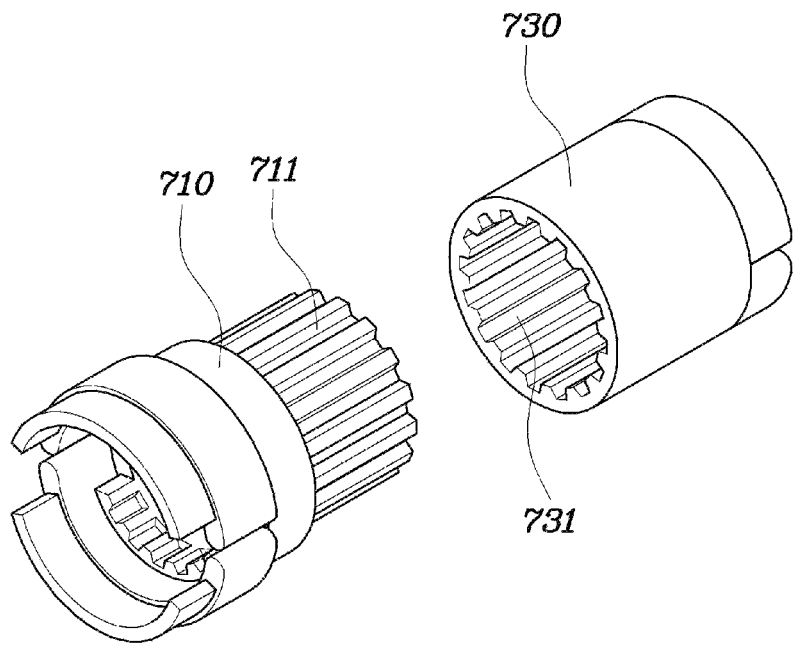
FIG. 7 is a diagram illustrating a coupling part in the state of FIG. 5.

FIG. 1 is an exploded perspective view of a window regulator apparatus according to an exemplary embodiment of the present invention, FIG. 2 is an assembled view of FIG. 1, in which a free rotating section at the time of ascending the window glass is illustrated, FIG. 3 is a cross-sectional view taken along the line A-A' of FIG. 2, and FIG. 4 is a diagram illustrating a coupling part in the state of FIG. 2. Further, FIG. 5 is a diagram illustrating a torque transfer section at the time ascending the window glass of FIG. 2, FIG. 6 is a cross-sectional view taken along the line B-B' of FIG. 5, and FIG. 7 is a diagram illustrating a coupling part in the state of FIG. 5.

A window regulator apparatus according to an exemplary embodiment of the present invention includes: a first operation part 300 configured to include a first housing 310 with which a bar-shaped central shaft 100 is through-connected and a first elastic member 330 which is connected inside of the first housing 310, a second operation part 500 configured to be disposed inwardly of the first operation part 300 and include a second housing 510 with which the central shaft 100 is through-connected and a second elastic member 530 connected inside of the second housing 510 to be slidably formed a longitudinal direction of the central shaft 100 from above the central shaft 100, and a connection part 700 configured to connect or disconnect the first operation part 300 and the second operation part 500 to or from each other, in which the connection part 700 is configured to include a pipe-shaped first socket 710 which is through-connected with the first housing 310 and a pipe-shaped second socket 730 which is through-connected with the second housing 510, and as the first elastic member 330 and the second elastic member 530, a spiral spring is generally used.

Describing a connection order from outside to inside of a vehicle, the first operation part 300 is configured to be provided with the bar-shaped central shaft 100, connected with the disk-shaped first housing 310 having a hollow through which the central shaft 100 penetrates, and connect the spiral spring, which is the first elastic member 330, with the inside of the first housing 310 while forming a concentric circle with the first housing 310. An outside of the first operation part 300 is connected with the first socket 710 of the connection part 700 which has a rugged part 711 and encloses the central shaft 100 and is provided with a first cover 800 having a shape to allow the first elastic member 330 to seal the first housing 310.

The second operation part 500 is configured so that the inside of the first operation part 300 is connected with the disk-shaped second housing 510 having a hollow with which the central shaft 100 is through-connected and the inside of the second housing 510 and the inside of the second housing 510 is connected with the spiral spring, which is the second elastic member 530, while forming the concentric circle with the second housing 510. An outside of the second operation part 500 is connected with the second socket 730 of the connection part 700 which has a rugged part 731 and encloses the central shaft 100 and is provided with a pipe-shaped support member 770 which has a screw groove 771 formed at an inner circumferential surface thereof to be engaged with a screw thread 110 formed on an outer surface of the central shaft 100. Both ends of the support member 770 are provided with flange parts to support the second socket 730 and a bushing, a bearing, or the like is connected between the second socket 730 and the support member 770. The inside of the second operation part 500 is provided with a second cover 900 and a fourth elastic member 910 is disposed between the second operation part 500 and the second cover 900, such that the second operation part 500 is more stably and elastically supported at the time of the rotation of the central shaft 100 than the related art.

Further, the first socket 710 and the second socket 730 are provided with the rugged parts 711 and 731 formed to correspond to each other so that the first socket 710 and the second socket 730 are fitted with each other, the outside of the second socket 730 is provided with a third elastic member 750 to prevent the second socket 730 from rotating at the time of the rotation of the central shaft 100, such that a reverse rotation of the second elastic member 530 is prevented, the first housing 310 and the second housing 510 have a plurality of protrusions 311 and 511 protruding along outer circumferential surfaces thereof, the protrusions 311 and 511 are through-connected with a plurality of connection members 550 to hold the connection member 550 in the state in which the first housing 310 and the second housing 510 are spaced apart from each other at a predetermined interval, and the second housing 510 slides on the connection member 550 at the time of the rotation of the central shaft 100 to move to the first housing 310 side.

According to the exemplary embodiment of the present invention, in order for a user to open and close the window of the vehicle door, the user operates a manual device formed to rotate a handle which is mounted in the vehicle. In this case, when the user rotates the handle to open the glass of the vehicle window, the central shaft 100 rotates and thus the second elastic member 530 of the second operation part 500 begins to be compressed and at the same time the support member 770 screw-connected with the central shaft slides while rotating toward the first operation part 300 side and the second socket 730 formed at the outside of the support member 770 slides and thus the second operation part 500 slides. In this case, the second elastic member 530 is held in the compressed state and thus is not restored during the movement. The contents are illustrated in FIGS. 2 to 4.

Similarly, FIGS. 5 to 7 illustrate the latter part of the ascending of the window glass and illustrate a section in which the torque is transferred. The first socket 710 and the second socket 730 hold the state in which they are not connected with each other until the second elastic member 530 is compressed by the predetermined amount at the time of the sliding of the second operation part 500. However, when the user continues to rotate the handle, the second operation part 500 moves to be closer to the first operation part 300 side, and the first socket 710 and the second socket 730 fixed to the first operation part 300 rotates together by being fitted with each other by the rugged parts 711 and 731 formed to correspond to each other so that the elastic energy of the second elastic member 530 is transferred to the first operation part 300 side while the first elastic member 330 and the second elastic member 530 are compressed.

Although not separately illustrated, the operation of the descending of the window glass is reversely performed to the ascending thereof. The window glass ascends in advance at the time of the descending of the glass to make the first socket 710 and the second socket 730 be in the connected state, such that at the early time of the descending, the elastic energy is stored by the compression of the second elastic member 530, and when the user is continued to rotate the handle, the second socket 730 is separated from the first socket 710 and the second operation part 500 rotates based on the central shaft 100 and thus is away from the first operation part 300. In this case, the second elastic member is not additionally compressed and moves depending on the rotation and at the end of the descending, the first socket 710 and the second socket 730 are not completely separated from each other and therefore freely rotate without storing the elastic energy in the second elastic member 530, such that the descending of the window glass is completed.

Figure 8:
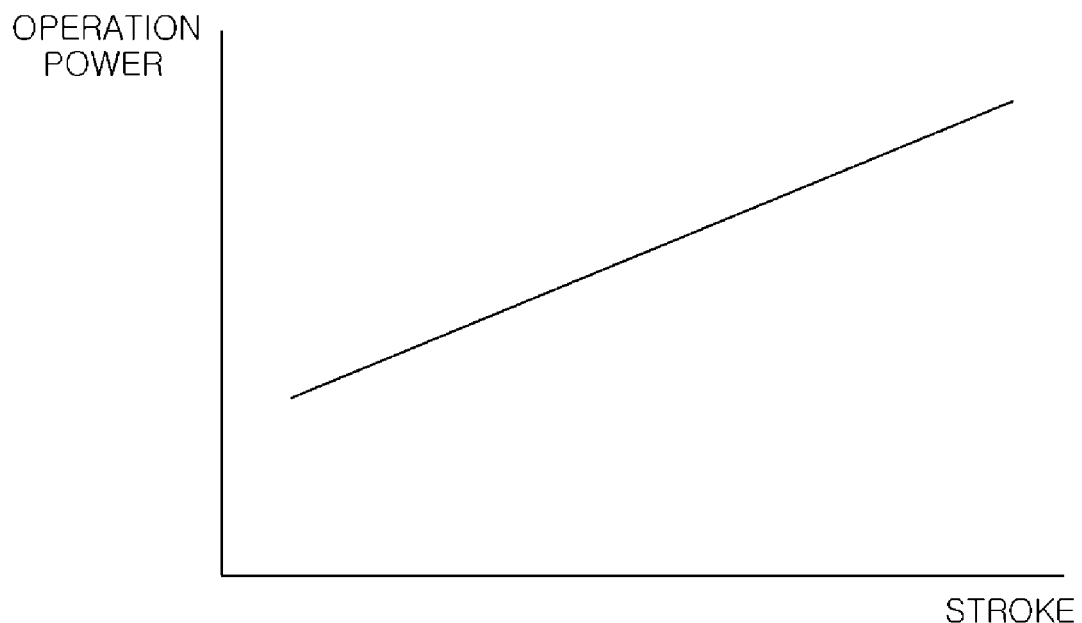
FIG. 8 is a graph illustrating a relationship between an operation power and a stroke according to the related art.
Figure 9:
FIG. 9 is a graph illustrating a relationship between an operation power and a stroke according to the exemplary embodiment of the present invention.

FIG. 8 is a graph illustrating a relationship between an operation power and a stroke according to the related art and FIG. 9 is a graph illustrating a relationship between an operation power and a stroke according to the exemplary embodiment of the present invention. It can be appreciated from referring to FIG. 8 that the operation power depending on the stroke is linearly increased. Therefore, since at the time of the ascending of the window glass, the spring torque is not transferred to the upper end point thereof, the user wastes a great deal of force at the time of the ascending and descending of the window glass, but it may be appreciated from the graph of FIG. 9 illustrating the results according to the exemplary embodiment of the present invention, the graph is linearly increased but the slope of the graph is smoothly increased from the middle point. Therefore, even though the user uses less force than before, the user may ascend and descend the window glass.

That is, according to the exemplary embodiment of the present invention, it is possible to make the user to easily ascend and descend the window glass with the smaller force by allowing the second elastic member to transfer the torque from approximately the middle portion at the time of the ascending or descending of the window glass which makes the user use a great deal of force. Therefore, the ascending operation power is reduced by the operation of the second elastic member at the time of the ascending of the window glass and the section in which the elastic member is used is reduced at the time of the descending of the window glass so as to minimize the increased amount of the operation power, thereby improving the marketability due the reduction in the operation power at the time of ascending and descending the window glass and improving the durability due to the structure in which the turn number of the first elastic member may be reduced.

According to the window regulator apparatus having the above structure, it is possible to make the user to easily ascend and descend the window glass with the smaller force by allowing the second elastic member to transfer the torque from approximately the middle portion at the time of the ascending or descending of the window glass which makes the user use a great deal of force. Therefore, the ascending operation power is reduced by the operation of the second elastic member at the time of the ascending of the window glass and the section in which the elastic member is used is reduced at the time of the descending of the window glass so as to minimize the increased amount of the operation power, thereby improving the marketability due to the reduction in the operation power at the time of ascending and descending the window glass and improving the durability due to the structure in which the turn number of the first elastic member may be reduced.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A window regulator apparatus, comprising:
   a first operation part including:
      a first housing with which a bar-shaped central shaft is through-connected; and
      a first elastic member which is connected inside of the first housing;
   a second operation part disposed inwardly of the first operation part and including:
      a second housing with which the central shaft is through-connected; and
      a second elastic member connected inside of the second housing to be slidable in a longitudinal direction of the central shaft along the central shaft; and
   a connection part selectively connecting or disconnecting the first operation part and the second operation part to or from each other.

2. The window regulator apparatus according to claim 1, wherein the connection part includes:
   a pipe-shaped first socket which is through-connected with the first housing; and
   a pipe-shaped second socket which is through-connected with the second housing.

3. The window regulator apparatus according to claim 2, wherein the first socket and the second socket are provided with splined parts formed at a point to correspond to each other so that the first socket and the second socket are fitted with each other.

4. The window regulator apparatus according to claim 2, wherein an outside of the second socket is provided with a third elastic member to prevent the second socket from rotating at a time of a rotation of the central shaft, such that a reverse rotation of the second elastic member is prevented.

5. The window regulator apparatus according to claim 2, wherein the second operation part slides to the first operation part side at a time of a rotation of the central shaft and after the second elastic member is compressed by a predetermined amount, the first socket and the second socket of the connection part are fitted with each other to simultaneously compress the first elastic member and the second elastic member.

6. The window regulator apparatus according to claim 2, wherein an inside of the second socket is connected with a pipe-shaped support member which has both ends provided with flange parts and through-connects the second socket.

7. The window regulator apparatus according to claim 6, wherein an inside of the support member is provided with a screw groove and the central shaft is provided with a screw thread along an outer circumferential surface of the central shaft to make the support member rotate along the screw thread of the central shaft so that the second socket performs a translational motion.

8. The window regulator apparatus according to claim 1, wherein the first housing and the second housing have a plurality of protrusions protruding along outer circumferential surfaces thereof and the protrusions are through-connected with a plurality of connection members.

9. The window regulator apparatus according to claim 8, wherein the connection member is held in the state in which the first housing and the second housing are spaced apart from each other at a predetermined interval, and the second housing slides on the connection member at a time of a rotation of the central shaft to move to the first housing side.

10. The window regulator apparatus according to claim 1, wherein the first elastic member and the second elastic member are a spiral spring.

11. The window regulator apparatus according to claim 1, wherein an inside of the first operation part and an inside of the second operation part are provided with first and second covers respectively and a fourth elastic member is formed between the second operation part and the second cover.

* * * * *